| United States Patent [19] | [11] Patent Number: 4,997,905 |
|---|---|
| Druet et al. | [45] Date of Patent: Mar. 5, 1991 |

[54] PROCESS FOR THE PREPARATION OF AMINOPLASTIC RESINS HAVING VERY LOW FORMALDEHYDE EMISSION RATES

[75] Inventors: Bernard Druet; Daniel Hopin, both of Choisy au Bac, France

[73] Assignee: Norsolor (Orkem Group), Paris, France

[21] Appl. No.: 289,273

[22] Filed: Dec. 23, 1988

[30] Foreign Application Priority Data

Dec. 23, 1987 [FR] France ................................ 87 17998

[51] Int. Cl.$^5$ ...................... C08G 12/12; C08C 14/10; C08K 3/38; C08L 61/34
[52] U.S. Cl. .................................. 528/230; 528/259; 528/260; 525/509; 524/14; 524/405; 524/597; 428/500; 428/504; 428/524; 428/528
[58] Field of Search .................... 524/14, 597, 405; 528/259, 260; 525/509

[56] References Cited

U.S. PATENT DOCUMENTS

| 2,898,324 | 8/1959 | Mackay | 524/111 |
|---|---|---|---|
| 3,874,990 | 4/1975 | Surdyk | 524/14 |
| 4,362,827 | 12/1982 | Tinkelenberg et al. | 524/15 |
| 4,482,699 | 11/1984 | Williams | 528/260 |
| 4,510,278 | 4/1985 | Hoetjer | 524/14 |
| 4,603,191 | 7/1986 | Kong | 528/259 |
| 4,814,422 | 3/1989 | Diem et al. | 528/256 |

FOREIGN PATENT DOCUMENTS

| 0025245 | 3/1981 | European Pat. Off. . |
|---|---|---|
| 0062389 | 10/1982 | European Pat. Off. . |
| 0010720 | 5/1984 | European Pat. Off. . |
| 0717083 | 7/1975 | Fed. Rep. of Germany . |
| 2455420 | 5/1976 | Fed. Rep. of Germany . |
| 2726512 | 12/1977 | Fed. Rep. of Germany . |
| 0190068 | 8/1986 | France . |
| 219786 | 3/1985 | German Democratic Rep. . |
| 0466252 | 11/1975 | U.S.S.R. . |

*Primary Examiner*—Morton Foelak
*Assistant Examiner*—P. Hampton-Hightower
*Attorney, Agent, or Firm*—Millen, White, & Zelano

[57] ABSTRACT

The preparation of aminoplastic resins containing melamine, having very low rates of formaldehyde emission, and being particularly useful for the production of particle boards. In a second stage of the process for preparing the resin, additional NH$_2$ (melamine and urea) is added to a conventional condensate solution at an increased pH between 6 and 9 so as to lower the F/NH$_2$ molar ratio to between 0.5 and 0.9. Urea is added in a third stage to obtain an F/NH$_2$ of between 0.30 and 0.50, with the optional addition of borax.

22 Claims, No Drawings

PROCESS FOR THE PREPARATION OF AMINOPLASTIC RESINS HAVING VERY LOW FORMALDEHYDE EMISSION RATES

BACKGROUND OF THE INVENTION

The present invention concerns a new process for the production of aminoplastic resins having very low formaldehyde emission rates. Its subject is more particularly a process for the production of urea-formaldehyde melamine "doped" resins which give off very little formaldehyde.

Urea-formaldehyde resins are known products which are widely used in the wood industry in particular for the production of particle boards. They are produced in a known manner by the condensation of urea and formaldehyde at pH between 4 and 7 and at a temperature near boiling point: this condensation reaction is preferably carried out in several stages.

The main drawback associated with urea-formaldehyde resins is that they give off large amounts of free formaldehyde. Attempts have been made to reduce the free formaldehyde content using various production processes: unfortunately, when particularly low formaldehyde contents are aimed at, experience shows that this objective is accompanied both by a decrease in reactivity and stability of the resins, and by deterioration of the mechanical properties of the finished boards. In order to avoid the presence of free formaldehyde, it has also been suggested that formaldehyde-free resins should be used, in particular resins based on isocyanate solutions. Unfortunately isocyanates are liable to pose toxicological problems.

Another way of limiting formaldehyde emissions consists in adding substances that fix this compound. Such substances would for instance include urea, melamine or phenol, or else high-protein flours. Unfortunately all processes that involve adding these formaldehyde-fixing additives to urea-formaldehyde resins have troublesome secondary effects, in particular, they retard the final condensation and hence the hardening of the glues.

There is therefore a need for the development of urea-formaldehyde resins having good stability and lower rates of emission of free formaldehyde, and whose utilization yields finished particle boards with good mechanical characteristics.

SUMMARY OF THE INVENTION

The present invention concerns a process for the production of urea-formaldehyde resin containing melamine characterized in that it comprises three stages, in that the melamine is added either at the first stage, or at the second, or at both first and second stages in quantities between 1 and 10 % relative to the weight of the finished liquid resin and in that at the first stage urea, formaldehyde and optionally melamine are condensed in solution at pH between 4.5 and 6 in quantities such that the F/NH$_2$ molar ratio at this stage is between 0.9 and 1.5, preferably between 0.95 and 1.15 and in that, at the second stage, more urea and optionally melamine are added, in quantities such that the resin's F/NH$_2$ ratio at this stage is between 0.5 and 0.9, this stage being conducted at pH between 6 and 9 and preferably between 7 and 8 and at a temperature between 70° and 100° C., the resulting resin being optionally subjected to vacuum distillation, then in the third stage, after cooling, and at a temperature below 50° C., having a quantity of urea added such that the resin's final F/NH$_2$ molar ratio is between 0.30 and 0.50; borax in a quantity up to a maximum of 0.5% by weight relative to the weight of finished liquid resin being optionally added.

It was found that operating under these conditions yielded urea-formaldehyde resins that were stable during storage having good viscosities enabling good adhesive-bonding. These urea-formaldehyde resins enable particle boards to be produced having lower free formaldehyde emission rates allied with satisfactory mechanical properties.

The process of the present application comprises condensing urea and formaldehyde in a first stage at pH between 4.5 and 6 in quantities such that the F/NH$_2$ molar ratio at this stage is between 0.9 and 1.5 and preferably between 0.95 and 1.15.

In a known manner, urea and formaldehyde precondensates may be used at this stage instead of formaldehyde alone. This stage is conducted in a known manner at the reflux temperature, say at a temperature above 85° C.

The second stage, object of the process of the invention, consists in adding more urea and melamine in quantities such that the resin's F/NH$_2$ ratio at this stage is between 0.5 and 0.9. The quantity of melamine added being between 1 to 10% by weight relative to the weight of finished liquid resin: this stage is carried out at pH between 6 and 9, preferably between 7 and 8, and at a temperature between 70° and 100° C. This stage is then optionally followed by a phase in which the resin is concentrated by vacuum distillation: this phase allows excess water to be removed. In a third stage, urea is added after cooling, at a temperature below 40° C., in a quantity such that the resin's final F/NH$_2$ molar ratio is between 0.30 and 0.50.

According to the invention borax may be added at the end of the synthesis, in a quantity up to a maximum of 0.5% by weight relative to the weight of finished liquid resin: addition of borax improves the resin's stability and reactivity and also the swelling of the boards.

A second alternative of the process of the invention comprises introducing the melamine during the first condensation stage, while operating under the conditions previously set forth.

A third alternative of the process of the invention comprises introducing melamine both during the first and during the second condensation stages, respecting the pH and F/NH$_2$ ratio conditions previously set forth.

The following examples illustrate the present invention. The quantities are expressed in parts by weight.

EXAMPLE 1

13,355 parts of a 50% solution of formaldehyde, and 6,360 parts of urea beads are placed in a reactor equipped with a condenser, a stirrer and a heating device: the reaction mixture is heated to a temperature between 85° and 98° C. for about 1 h 30 minutes and maintained at pH near 5 by the addition of formic acid. On completion of condensation, determined by measuring the viscosity which should be between 275 and 300 mPa s at 40° C., the pH is brought to a value near 7 by addition of caustic soda.

3,825 parts of urea and 825 parts of melamine are then added to the reaction mixture: the reaction is conducted at a temperature between 75° and 80° C. and pH near 7. At the end of this stage the F/NH$_2$ molar ratio is 0.62. The reaction mixture is then concentrated under vacuum at 50° C., allowing 545 parts of water to be distilled out. Then 3,430 parts of urea are added at 30° C. The resulting final resin has a F/NH$_2$ molar ratio of 0.47: its pH is 0.5. Its other characteristics are as follows:

| | |
|---|---|
| Viscosity (20° C.) | 750 mPa s |
| Solids content % | 65 |
| Dilutability with water (20° C.) | 0.5/1 |
| Gelling time at 100° C. (with 5% of a 15% solution of ammonium chloride) | 5 minutes |
| Stability at 20° C. (time after which the resin's viscosity reached 3 Pa s) | 60 days |

The resulting resin is used to produce particle boards. To this end the resin is cured with 1.5% of ammonium chloride relative to the quantity of dry resin. The boards are pressed at 180° C. for 3 minutes: they have the following characteristics:

| | |
|---|---|
| Thickness (mm) | 20 |
| Relative density (kg/m$^3$) | 615 |
| Swelling 24 hours in water at 20° C., % | |
| According to NF standard | 17.5 |
| According to DIN standard | 18.4 |
| Perpendicular tensile strength (daN/cm$^2$) | 4.6 |
| Perforator formaldehyde (mg/100 g dry board) | 4.0 |

The boards' characteristics were established according to the following standards:

| | |
|---|---|
| Thickness | NFB 51200 |
| Relative density | NFB 51222 |
| Perpendicular tensile strength | NFB 51250 |
| Swelling | NFB 51252 |
| | DIN 68763 |
| Formaldehyde content | CEN-EN-120 |

EXAMPLE 2

Example 1 is repeated but using 6% of melamine relative to the weight of liquid resin. The resulting resin has the following characteristics:

| | |
|---|---|
| Viscosity (20° C.) | 820 mPa s |
| Solids content % | 65.3 |
| Dilutability with water (20° C.) | 0.7/1 |
| Gelling time at 100° C. (with 5% of a 15% NH$_4$Cl solution) | 7 minutes |
| Change in stability | 65 days: (time after which viscosity reaches a viscosity of 3 Pa s) |

Boards made with this resin have the following characteristics:

| | |
|---|---|
| Thickness (mm) | 20 |
| Relative density (kg/m$^3$) | 611 |
| Swelling (in water at 20° C. during 24 hours %) | |
| According to NF standard | 15.9 |
| According to DIN standard | 16.6 |
| Perpendicular tensile strength (daN/cm$^2$) | 4.5 |
| Perforator formaldehyde | 4 |

EXAMPLE 3

Example 2 was repeated without adding melamine but adding 0.1% of borax at the completion of synthesis. The resulting resin has the following characteristics:

| | |
|---|---|
| Specific gravity (20%) | 1.277 |
| Viscosity (20° C.) | 590 mPa s |
| Solids content % | 65.1 |
| Dilutability with water | 1.5/1 |
| pH | 8.3 |
| Gelling time at 100° C. | 1 minute |
| (using 5% of NH$_4$Cl solution) | 5 seconds |

Boards made with this resin have the following characteristics:

| | |
|---|---|
| Thickness (mm) | 20.5 |
| Relative density (kg/m$^3$) | 616 |
| Swelling % | |
| NF | 23.3 |
| DIN | 24.5 |
| Perpendicular tensile strength (daN/cm$_2$) | 2.6 |
| Perforator formaldehyde | 3.5 |

EXAMPLE 4

Example 1 is repeated but using the following reagents:

| |
|---|
| in the first stage: |
| 1840 parts of 50% formaldehyde |
| 800 parts of urea |
| the F/NH$_2$ molar ratio is 1.15 |
| in the second stage: |
| 444 parts of urea |
| 240 parts of melamine |
| the F/NH$_2$ molar ratio is 0.65 |
| in the third stage: |
| 676 parts of urea | the resulting resin's F/NH$_2$ molar ratio is 0.44

The resulting resin has the following characteristics:

| | |
|---|---|
| Viscosity (20° C.) | 930 mPa s |
| Solids content | 65% |
| pH | 7.5 |
| Dilutability with water | 0.6/1 |
| Stability at 20° C. | 41 days (for viscosity 20° C.: 3 Pa s) |

Boards made with this resin have the following characteristics:

| | |
|---|---|
| Thickness (mm) | 20.3 |
| Relative density | 605 |
| Perpendicular tensile strength | 4.3 |
| Swelling % | |
| NF | 19.3 |
| DIN | 20.6 |
| Perforator formaldehyde | 3.5 |

EXAMPLE 5

The resin is produced using the following reagents:

| 1st stage | 46.62% formaldehyde | 2529 parts |
| | Urea | 1123 parts |
| | (hence F/NH$_2$ = 1.05) | |
| 2nd stage | Urea | 522 parts |
| | Melamine | 360 parts |
| 3rd stage | Urea | 1466 parts |

The resulting resin's F/NH$_2$ ratio is 0.35. The resin has the following characteristics:

| Viscosity 20° C. | 520 mPa s |
| Solids content % | 66.0 |
| pH | 8.3 |
| Dilutability with water | 0.5/1 |

The same resin having had 0.1% borax added during production has the following characteristics:

| Viscosity at 20° C. | 530 mPa.s |
| Solids content | 66.1 |
| pH | 9.5 |
| Dilutability with water | 0.5/1 |
| Stability = 20° C. = 105 days (time after which the viscosity reaches 3 Pa s). | |

The boards produced have the following characteristics:

| Thickness (mm) | 20.4 |
| Swelling 24 h (%) | |
| NF | 35.4 |
| DIN | 35.9 |
| Perpendicular tensile strength | 0.8 |
| Formaldehyde content | 2.5 |

EXAMPLE 6

Example 1 is repeated, using in the first stage:

| 50% formaldehyde | 1840 parts |
| Urea | 705 parts |
| Melamine | 240 parts |

This stage is conducted at an acid pH of 6. The F/NH$_2$ molar ratio is 1.05.

Next, when the viscosity of the reaction medium (at 40° C.) is 550 mPa s, 964 parts of urea are added. The F/NH$_2$ molar ratio is 0.5; this stage is carried out at pH 6.5. Then, as the reaction reaches completion, 251 parts of urea are added. The resin has the following characteristics:

| Viscosity 20° C. | 315 mPa.s |
| Solids content | 64.6% |
| pH | 8.2 |
| Dilutability with water | 0.75/1 |
| Gelling time at 100° C. with 5% NH$_4$Cl solution | 15 minutes |
| Stability at 20° C. | 170 days |

Boards made with this resin have the following characteristics:

| Thickness (mm) | 20.3 |
| Relative density (kg/m$^3$) | 619 |
| Swelling % | |
| NF | 12.8 |
| DIN | 13.7 |
| Perpendicular tensile strength (daN.cm$^2$) | 4.9 |
| Perforator formaldehyde | 3.5 |

EXAMPLE 7

Example 1 is repeated using the following reagents:

| 1689 | parts of a urea-formaldehyde precondensate containing 57% formaldehyde and 23.6% urea. |
| 582 | parts of water |
| 529 | parts of urea |

The F/NH$_2$ molar ratio at this stage is 1.05. After this acid condensation stage, the following are then added:

| 464 parts of urea |
| 240 parts of melamine |

The F/NH$_2$ molar ratio at this stage is 0.62.

In a third stage 4 parts of borax are added, and 496 parts of urea. The resulting final resin has the following characteristics:

| F/NH$_2$ = 0.47 | |
| Viscosity at 20° C. | 0.74 Pa s |
| Solids content | 65.3% |
| pH | 8.3 |
| Gelling time at 100° C. | 13 minutes |
| Stability at 20° C. | 70 days |
| Characteristics of the boards: | |
| Thickness (mm) | 20.2 |
| Relative density (kg/m$^3$) | 610 |
| Swelling 24 h - water 20° C. (%) | |
| NF | 18.8 |
| DIN | 19.1 |
| Perpendicular tensile strength (daN/cm$^2$) | 3.0 |
| Perforator formaldehyde (mg/100 g) | 4.5 |

EXAMPLE 8

Example 1 is repeated using the following reagents:
In the first stage:
    2677 parts of a 47.3% solution of formaldehyde
    1207 parts of urea
The F/NH$_2$ molar ratio at this stage is 1.05.
In the second stage the following are used:
451 parts of urea
540 parts of melamine
The F/NH$_2$ molar ratio at this stage is 0.62.
As condensation reaches completion 6 parts of borax are added and 1125 parts of urea.
The resulting resin has the following characteristics:

| F/NH$_2$ = 0.40 | |
| Viscosity at 20° C. | 1.09 Pa s |
| Solids content (%) | 65 |
| Specific gravity (20° C.) | 1.280 |
| pH | 9.3 |

EXAMPLE 9

The same procedure is followed as in example 2, but with the addition of 0.25% of borax.

| | |
|---|---|
| Viscosity 20° C. | 0.60 Pa s |
| Solids content (%) | 64.3 |
| Dilutability in water at 20° C. | 0.7/1 |
| Gelling time at 100° C. (with a 15% NH$_4$Cl solution) | 4 minutes |

Boards, produced with an 18% higher rate of application of adhesive have the following characteristics:

| | |
|---|---|
| Thickness (mm) | 20 |
| Relative density (kg/m$^3$) | 645 |
| Swelling (24 h - water 20° C. %) | |
| NF | 9.5 |
| DIN | 12.2 |
| Perpendicular tensile strength (daN/cm$^2$) | 5.5 |
| Perforator formaldehyde (mg/100 g dry board): | 4 |

EXAMPLE 10

The same procedure is followed as in example 5, but with addition of 0.25% of borax

| | |
|---|---|
| Viscosity 20° C. | 0.66 Pa s |
| Solids content (%) | 65.5 |
| pH | 9.2 |
| Dilutability with water 20° C. | 0.5/1 |

Boards, produced with an 18% higher rate of application of adhesive have the following characteristics:

| | |
|---|---|
| Thickness (mm) | 20.3 |
| Relative density (kg/m$^3$) | 630 |
| Swelling 24 h - water 20° C. (%) | |
| NF | 28.3 |
| DIN | 30.0 |
| Perpendicular tensile strength (daN/cm$^2$) | 1.8 |
| Perforator formaldehyde (mg/100 g) | 2.5 |

EXAMPLE 11

The same procedure is followed as in example 8 but with the addition of 0.25% of borax.

| | |
|---|---|
| Viscosity 20° C. | 0.88 Pa s |
| Solids content (%) | 64.6% |
| Specific gravity 20° C. | 1.280 |
| pH | 9.2 |
| Dilutability in water 20° C. | 0.5/1 |

Boards, produced with an 18% higher rate of application of adhesive, have the following characteristics:

| | |
|---|---|
| Thickness (mm) | 20.0 |
| Relative density (kg/m$^3$) | 645 |
| Swelling 24 h - water 20° C. (%) | |
| NF | 11.4 |
| DIN | 14.2 |
| Perpendicular tensile strength (daN/cm$^2$) | 4.8 |
| Perforator formaldehyde (mg/100 g) | 3.5 |

We claim:

1. Process for the production of urea-formaldehyde resins containing melamine characterized in that it comprises three stages, in that the melamine is added either at the first stage, or at the second stage, or at both first and second stages in quantities between 1 and 10% relative to the weight of the finished liquid resin and in that at the first stage urea, formaldehyde and optionally melamine are condensed in solution at pH between 4.5 and 6 in quantities such that the F/NH$_2$ molar ratio at this stage is between 0.9 and 1.5, and in that, at the second stage, more urea and optionally melamine are added in quantities such that the resin's F/NH$_2$ ratio at this stage is between 0.5 and 0.9, this stage being conducted at pH between 6 and 9 and at a temperature between 70° and 100° C., the resulting resin being optionally subjected to vacuum distillation, then in a third stage, after cooling, and at a temperature below 50° C., having a quantity of urea added such that the resin's final F/NH$_2$ molar ratio is between 0.30 and 0.50; borax in a quantity up to a maximum of 0.5% by weight relative to the weight of finished liquid resin being optionally added.

2. A process according to claim 1, wherein borax is added to the finished liquid resin.

3. A process according to claim 1, wherein the F/NH$_2$ molar ratio in the first stage is between 0.95 and 1.15.

4. A process according to claim 1, wherein the second stage is conducted at a pH between 7 and 8.

5. A process according to claim 3, wherein the second stage is conducted at a pH between 7 and 8.

6. A process according to claim 1, wherein all the melamine is added in the second stage.

7. A process according to claim 5, wherein all the melamine is added in the second stage.

8. An aminoplast resin as produced by the process of claim 1.

9. An aminoplast resin as produced by the process of claim 2.

10. An aminoplast resin as produced by the process of claim 5.

11. An aminoplast resin as produced by the process of claim 6.

12. An aminoplast resin as produced by the process of claim 7.

13. In a process for the production of particle boards comprising compressing a mass of wood particles with a liquid binder at an elevated temperature, the improvement which comprises employing as the liquid binder a solution of an aminoplast resin according to claim 8.

14. In a process for the production of particle boards comprising compressing a mass of wood particles with a liquid binder at an elevated temperature, the improvement which comprises employing as the liquid binder a solution of an aminoplast resin according to claim 10.

15. In a process for the production of particle boards comprising compressing a mass of wood particles with a liquid binder at an elevated temperature, the improvement which comprises employing as the liquid binder a solution of an aminoplast resin according to claim 12.

16. A particle board as produced by the process of claim 13.

17. A particle board as produced by the process of claim 14.

18. A particle board as produced by the process of claim 15.

19. A process according to claim 1, wherein all of the melamine is added in the first stage.

20. An aminoplast resin as produced by the process of claim 19.

21. A process according to claim 1, wherein the final liquid resin was formed from components consisting essentially of formaldehyde, urea and melamine.

22. A process according to claim 1, wherein the final F/NH$_2$ molar ratio is not more than 0.47.

* * * * *